United States Patent [19]

Baik

[11] Patent Number: 5,790,592
[45] Date of Patent: Aug. 4, 1998

[54] TERMINAL OF A CODE DIVISION MULTIPLE ACCESS CELLULAR COMMUNICATION SYSTEM, AND A TRANSMIT AND RECEIVE DATA PROCESSING METHOD THEREOF

[75] Inventor: June-Yeob Baik, Suwon, Rep. of Korea

[73] Assignee: Samsung Electronics Co., Ltd., Suwon, Rep. of Korea

[21] Appl. No.: 672,549

[22] Filed: Jun. 28, 1996

[30] Foreign Application Priority Data

Aug. 28, 1995 [KR] Rep. of Korea .................. 26972/1995

[51] Int. Cl.⁶ ........................................................ H04B 1/38
[52] U.S. Cl. .................... 375/219; 375/341; 371/43.7; 370/342; 455/425
[58] Field of Search ........................... 375/200, 205, 375/219, 220, 225, 262, 295, 340, 341, 377; 371/2.1, 5.1, 5.3, 5.5, 37.5, 43, 67.1, 69.1; 370/241, 252, 253, 310, 319, 320, 335, 337, 342, 347; 379/58, 59; 380/34; 455/403, 422, 425

[56] References Cited

U.S. PATENT DOCUMENTS 5,436,942  7/1995  Cheng et al. ..................... 375/229
5,546,420  8/1996  Seshadri et al. .................. 375/200
5,566,206  10/1996 Butler et al. ..................... 375/225

*Primary Examiner*—Don N. Vo
*Assistant Examiner*—Amanda T. Le
*Attorney, Agent, or Firm*—Dilworth & Barrese

[57] ABSTRACT

A terminal and a method therefor in which only one digital signal processor DSP is utilized, thereby decoding receive data and encoding transmit data in a code division multiple access cellular communication system. The terminal according to the present invention comprises: a DSP for executing a program which includes a sub-routine for determining receive data bit rate, and encoding data to be transmitted according to a transmit data rate; a controller for controlling encoding and decoding operations of the DSP; a modulator for modulating data encoded by the DSP; a demodulator for demodulating receive data, thereby to input the demodulated data to the DSP; a speech encoder for encoding speech information to be transmitted, thereby to input the encoded speech information to the controller; and a speech decoder for restoring data decoded by the DSP.

5 Claims, 7 Drawing Sheets

TERMINAL OF A CODE DIVISION MULTIPLE ACCESS CELLULAR COMMUNICATION SYSTEM, AND A TRANSMIT AND RECEIVE DATA PROCESSING METHOD THEREOF

BACKGROUND OF THE INVENTION

1. Field of the Invention

The present invention relates to a terminal of a digital cellular communication system which utilizes code division multiple access, and more particularly to a terminal for decoding receive data and encoding transmit data with one digital signal processor, and a transmit and receive data processing method thereof.

The terminal and method according to the present invention is based on Korean Application No. 26972/1995.

2. Description of the Related Art

A representative code division multiple access (Hereinafter referred to as "CDMA") approach which is utilized in a digital cellular communication system or a communication network includes one base station and a plurality of terminals (i.e., mobile stations). According to the CDMA approach, the base station and the terminals utilize a traffic channel and control channels, thereby to transmit and receive speech information and the control signals.

FIG. 1 is a block diagram illustrating a conventional terminal of a CDMA cellular communication system. Referring to FIG. 1, receive data TD transmitted from the base station is inputted to a demodulator 102B, and the demodulator 102B demodulates receive data TD, thereby to output data BSD therefrom. Data BSD is de-interleaved by a de-interleaver 104B, and then de-interleaved data PD is outputted therefrom. And then, data PD is decoded by a Viterbi decoder 106, that is, a channel decoder, and then decoded data is outputted therefrom as data DD. Because there is not any method for identifying a receive data bit rate (e.g., 9600 bps, 4800 bps, 2400 bps, and 1200 bps) at the time of a decoding procedure, the Viterbi decoder 106 should be operated to extract data concerned with data rates to thereby perform repeatedly the decoding procedure. A controller 110 performs a cyclic redundancy check (Hereinafter referred to as "CRC") for decoded data DD respectively concerned with the receive data bit rates to thereby detect whether there is a CRC error, and selects concerned data according to whether there is the CRC error to thereby input data BRD to a speech decoder 112B. And then, the speech decoder 112B restores inputted data BRD as speech information.

On the other hand, at the time of transmitting speech information, a channel encoder 108 performs channel-encoding of data DE inputted through a speech encoder 112A and the controller 110 in accordance with the determined data rate, thereby to output data PE therefrom. Also, an interleaver 104A interleaves channel-interleaved data PE, thereby to output data BSE therefrom. And then, a modulator 102A modulates data BSE, thereby to output transmit data TE therefrom.

The conventional terminal of the CDMA cellular communication system as shown in FIG. 1 is a well-known technique to a person having an ordinary skill in the art and is used by Qualcomm, Inc. But, there has been a problem in which the number of internal parts of the terminal is increased because the conventional terminal of FIG. 1 comprises the channel-encoder 108, the Viterbi decoder 106, the interleaver 104A and the de-interleaver 104B as separate units. To solve the problem, a technique has been already disclosed in which functions of the Viterbi decoder and the de-interleaver can be performed by utilizing one digital signal processor (Hereinafter referred to as "DSP"), in Korean Patent Application No. 1993-17257 for "A channel decoding apparatus of a terminal of utilizing a code division multiple access way, and a method therefor", which is commonly assigned to SAMSUNG Electronics, Co., Ltd., the same applicant as the present invention, on Aug. 31, 1993.

Briefly describing an operation of a channel decoding process according to the technique discussed above, the channel decoding apparatus of Korean Patent Application No. 1993-17257 receives speech information transmitted from the base station, in accordance with an interrupt signal generated by a period of 20 msec, and then deinterleaves received speech information. And then, after the receive data bit rate is determined, the processes of Viterbi-decoding and storing are performed. After the CRC error checking process, stored speech information is inputted to the speech decoder and then is restored. At this time, the interrupt signal is commonly generated with a period of every 20 msec. But, it takes about 15 msec to receive, decode and store speech information. And an idle state of the interrupt signal is maintained until the next interrupt signal is generated.

SUMMARY OF THE INVENTION

It is therefore an object of the invention to provide a terminal for utilizing only one digital signal processor DSP for decoding receive data and encoding transmit data in a code division multiple access cellular communication system.

It is another object of the invention to provide a method for decoding receive data and encoding transmit data within an interrupt when the interrupt cycle is generated every predetermined time unit in a code division multiple access cellular communication system comprising one digital signal processor DSP.

It is still another object of the invention to provide a terminal of a code division multiple access cellular communication system, and a method for processing transmit and receive data of the terminal, thereby to decrease the number of internal parts of the terminal.

To achieve these and other objects, the present invention is directed to a terminal of a CDMA cellular communication system in which functions of a channel encoder, an interleaver, a Viterbi decoder, and a de-interleaver can be performed by utilizing one digital signal processor DSP.

The terminal according to the present invention comprises: a DSP for executing a program which includes a sub-routine for determining receive data bit rate, and encoding data to be transmitted according to a transmit data rate; a controller for controlling encoding and decoding operations of the DSP; a modulator for modulating data encoded by the DSP; a demodulator for demodulating receive data, thereby to input the demodulated data to the DSP; a speech encoder for encoding speech information to be transmitted, thereby to input the encoded speech information to the controller; and a speech decoder for restoring data decoded by the DSP.

BRIEF DESCRIPTION OF THE DRAWINGS

The following is a detailed description of the invention by the reference of their attachable drawings, in which like numbers indicate the same or similar elements.

DETAILED DESCRIPTION OF THE PREFERRED EMBODIMENT

First of all, it should be noted that a detailed description for a related known function or configuration is omitted from the following description in order to avoid making unclear the subject matter of the present invention.

Figure 1:
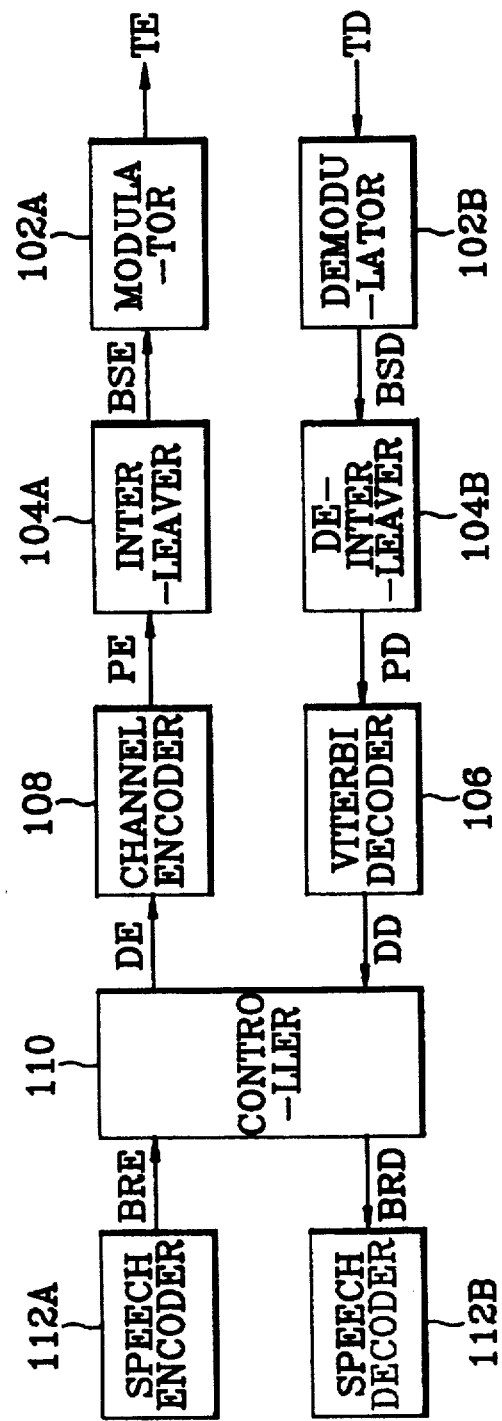
FIG. 1 is a block diagram illustrating a conventional terminal of a code division multiple access cellular communication system.
Figure 2:
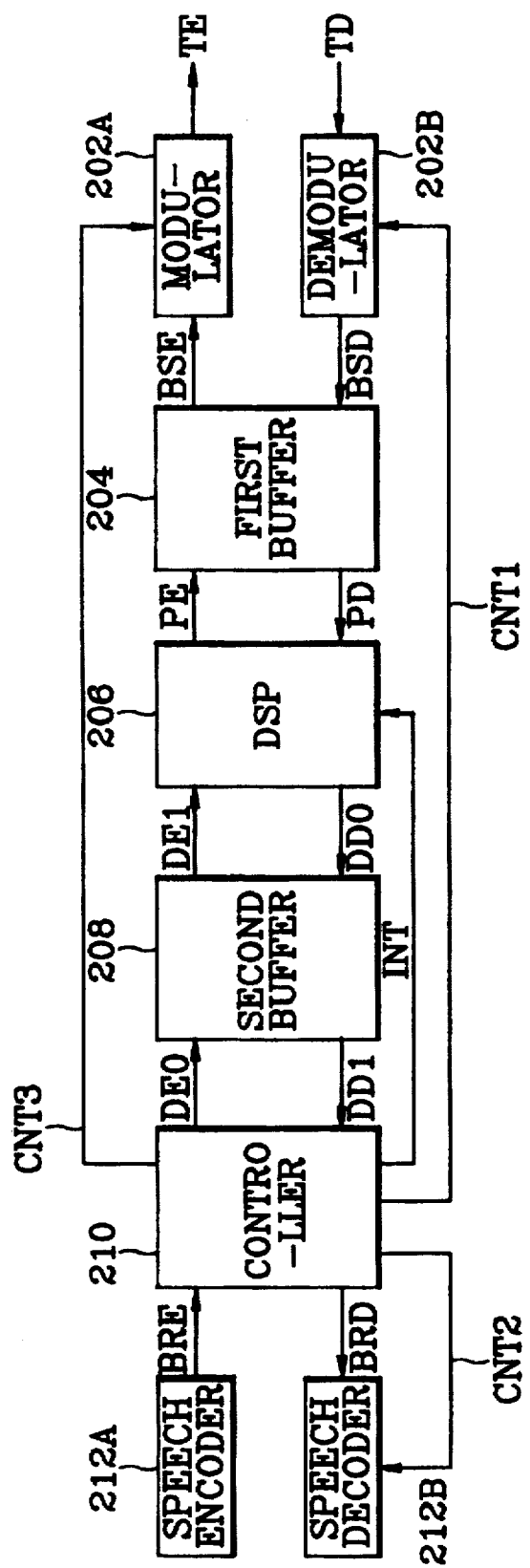
FIG. 2 is a block diagram illustrating a terminal of a code division multiple access cellular communication system according to the present invention.

FIG. 2 is a block diagram illustrating a terminal of a code division multiple access cellular communication system according to the present invention. The terminal of FIG. 2 comprises: a DSP 206 for performing a channel-encoding and channel-decoding operation; a controller 210 for generating an interrupt signal INT every predetermined time unit, preferably every around 20 msec, thereby to input the generated interrupt signal INT to the DSP 206, and for generating a first control signal CNT1, a second control signal CNT2 and a third control signal CNT3, thereby to respectively input the generated signals CNT1, CNT2 and CNT3 to a demodulator 202B, a voice decoder 212B and a modulator 202A; a first buffer 204 for buffering input/output data, the first buffer being connected between the DSP 206 and the modulator 202A and the demodulator 202B; and a second buffer 208 for buffering input/output data, the second buffer being connected between the controller 210 and the DSP 206.

Figure 3:
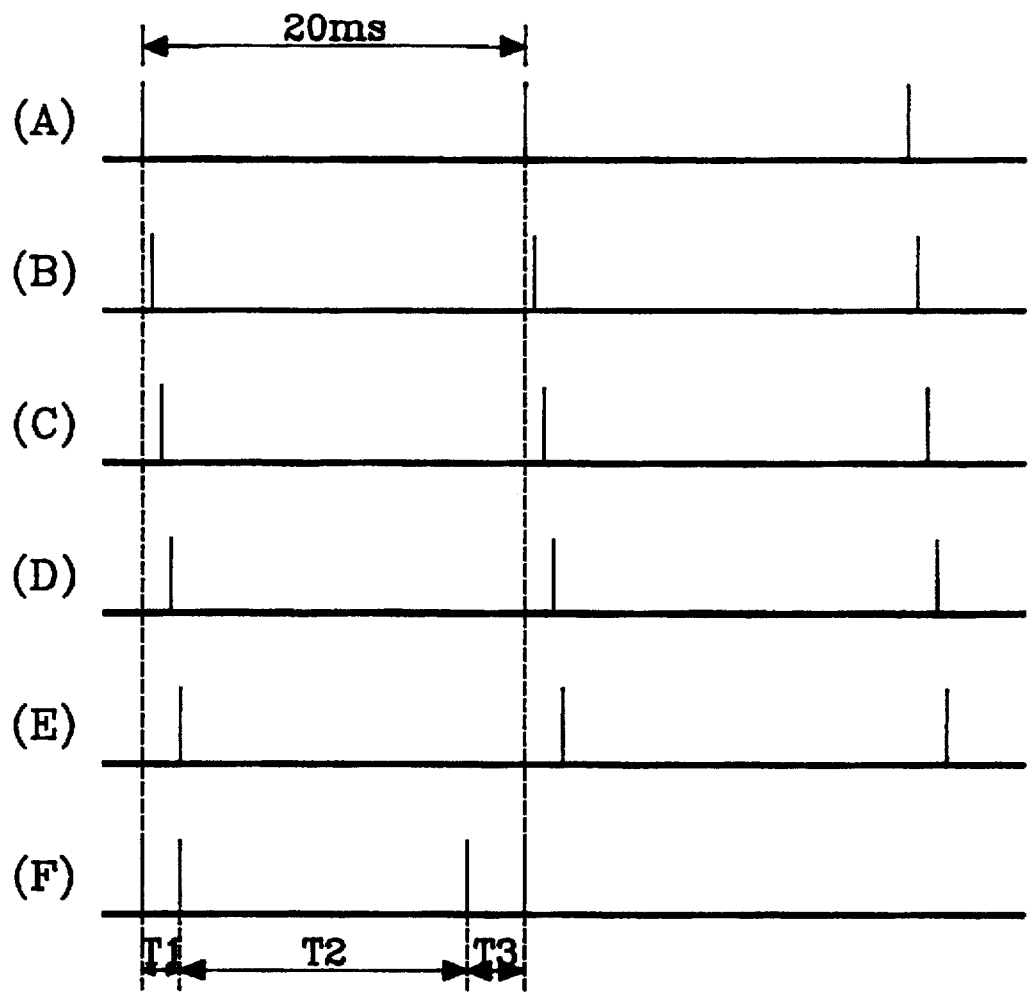
FIG. 3 is a view illustrating an operation timing of a terminal of a code division multiple access cellular communication system according to the present invention.

FIG. 3 is a view illustrating an operation timing of a terminal of a code division multiple access cellular communication system according to the present invention. FIG. 3 at A shows the operation timing of 20 msec interrupt signal INT outputted from the controller 210, FIG. 3 at B shows a time at which data BSD demodulated by the demodulator 202B and stored in the first buffer 204 is inputted to the DSP 206 at the time of the channel-decoding operation, FIG. 3 at C shows the time at which resultant data DDO processed by the DSP 206 is stored in the second buffer 208 at the time of a channel-decoding operation, FIG. 3 at D shows the time at which resultant data PE processed by the DSP 206 is stored in the first buffer 204 at the time of a channel-encoding operation, and FIG. 3 at E shows the time at which data BRE encoded by the voice encoder 212A is inputted to the second buffer 208 via the controller 210 at the time of the channel-encoding operation. Also, FIG. 3 at F shows that the channel-encoding operation and the channel-decoding operation are performed within a period of around 20 msec of the interrupt signal INT.

Figure 4:
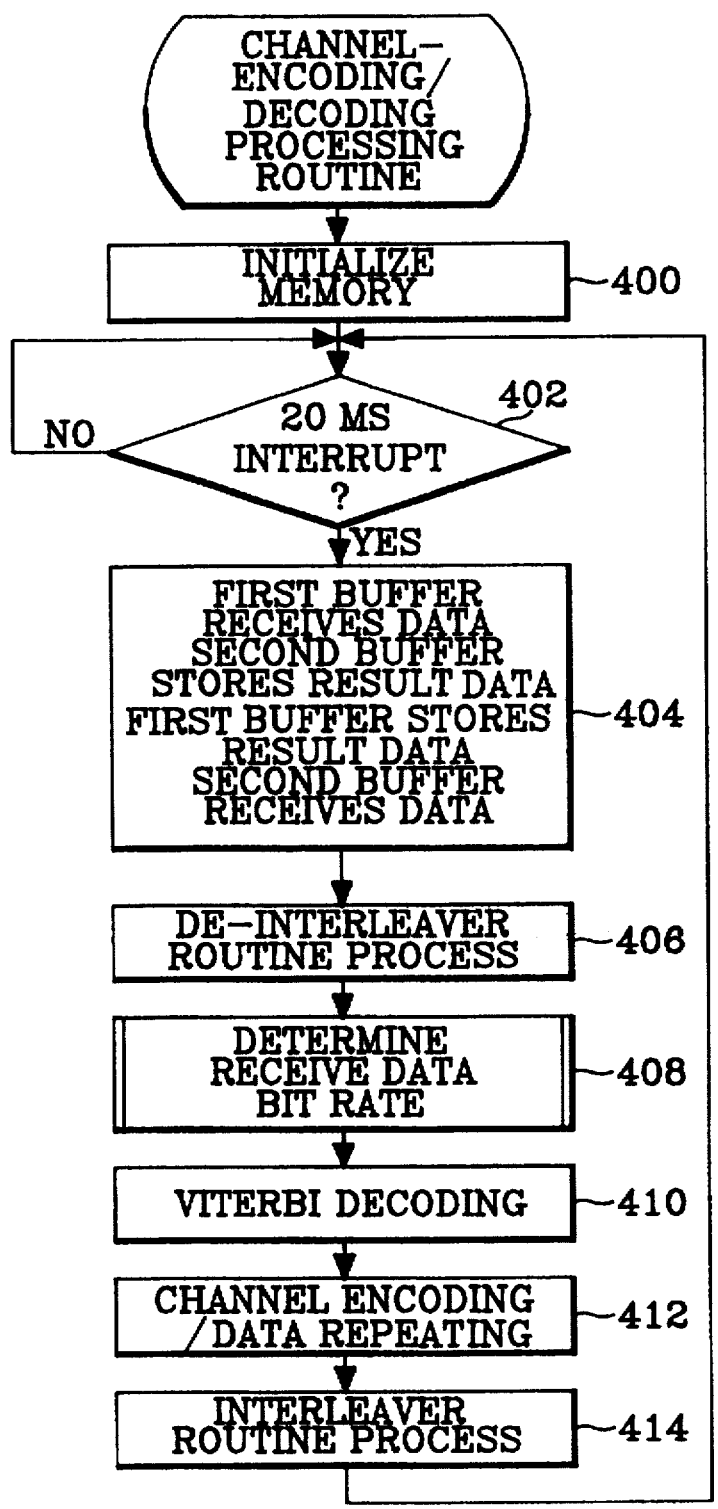
FIG. 4 is a flow chart illustrating a process for performing a channel-encoding and a channel-decoding of transmit and receive data by a digital signal processor DSP as shown in FIG. 2.

FIG. 4 is a flow chart illustrating processes of performing a channel-encoding of transmit data and a channel-decoding of receive data by a digital signal processor DSP 206 shown in FIG. 2.

As receive data TD is one of variable bit rate of 9600 bps, 4800 bps, 2400 bps and 1200 bps, which is outputted from the base station is inputted to the demodulator 202B, the demodulator 202B performs a 4-bit soft decision for receive data TD in accordance with the first control signal CNT1 of the controller 210, thereby to output demodulated data BSD therefrom. And the first buffer 204 buffers demodulated data BSD. On the transmit/encode path, the controller 210 inputs speech signal data and control information data which are encoded by the speech encoder 212A, as data BRE thereto, and then buffers data DE0 to the second buffer 208.

On the other hand, after the DSP 206 initializes all necessary memories that is, the first buffer 204 and the second buffer 208 in step 400 of FIG. 4, the DSP 206 checks in step 402 whether 20 msec interrupt signal INT is generated from the controller 210. If it is checked that the interrupt signal INT is generated from the controller 210 as shown in FIG. 3 at A, the DSP 206 reads out and receives input data PD outputted from the first buffer 204 to which data BSD outputted from the demodulator 202B is buffered at the time as shown in FIG. 3 at B in step 404. Also, the DSP 206 reads out and receives input data DE1 from the second buffer 208 to which data DE0 is buffered at the time as shown in FIG. 3 at E. And then, in steps 406 to 410, the DSP 206 performs the channel-decoding operation for data PD which is read out from the first buffer 204. Also, in steps 412 and 414, the DSP 206 performs the channel-encoding operation for data DE1 which is read out from the second buffer 208.

First of all, the DSP 206 performs a de-interleaver routine in step 406. At this time, data PD, which is read out from the first buffer 204 by the above de-interleaver routine, is arranged in a sequence of initial data before being transmitted from the base station. The DSP 206 performs the process of determining the receive data bit rate in step 408 for searching the data rate of the signal transmitted from the base station, by utilizing data arranged in the sequence of initial data. The operation for determining the receive data bit rate is performed according to the flow chart shown in FIG. 5. In accordance with the flow chart of FIG. 5, the operation for determining the receive data bit rate as one of 1200 bps, 2400 bps, 4800 bps and 9600 bps has similarly been disclosed in Korean Patent Application No. 1993-17257 and will be in detail described below. After the receive data bit rate is determined, the DSP 206 performs the Viterbi decoding process in step 410. During T2 of FIG. 3 at F, receive data TD transmitted from the base station is de-interleaved, the receive data bit rate is determined and Viterbi decoding is performed in about 15 msec.

Next, the DSP 206 performs the channel-encoding operation during time T3 of FIG. 3 at F. In other words, the DSP 206 performs the encoding process and the data repeating process according to the determined transmit data rate in step 412, and performs an interleaver routine process in step 414.

As discussed above, after the operations of the channel-decoding and the channel-encoding are performed within one period of the 20 msec interrupt signal INT, in the case that the next interrupt signal INT is generated, the above mentioned operations are repeatedly performed. In other words, at the time of FIG. 3 at B, the DSP 206 receives data stored in the first buffer 204, thereby to perform the channel decoding operation, and to receive data stored in the second buffer 208, thereby to perform the channel encoding operation. And then, the DSP 206 stores processed data DD0, which is channel-decoded in the second buffer 208, and stores data PE, which is channel-encoded in the first buffer 204. At this time, result data processed by the DSP 206 is stored in the first buffer 204 and the second buffer 206 in step 404, and at the same time, data stored in the first buffer 204 for channel-decoding and data stored in the second buffer 208 for channel-encoding are inputted to the DSP 206. As discussed above, there is an advantage in which data processed by the DSP 206 and data to be processed are stored and inputted at the same time, thereby shortening the necessary time for data processing. In other words, the DSP 206 receives data to be processed during T1 of FIG. 3 at F. At the same time, the DSP 206 stores data which has been already processed, channel-decodes data received during T2 and channel-encodes data received during T3. In FIG. 4, the step 404 are performed during T1, the steps 406 to 410 correspond to T2, and the steps 412 to 414 correspond to T3.

Figure 5:
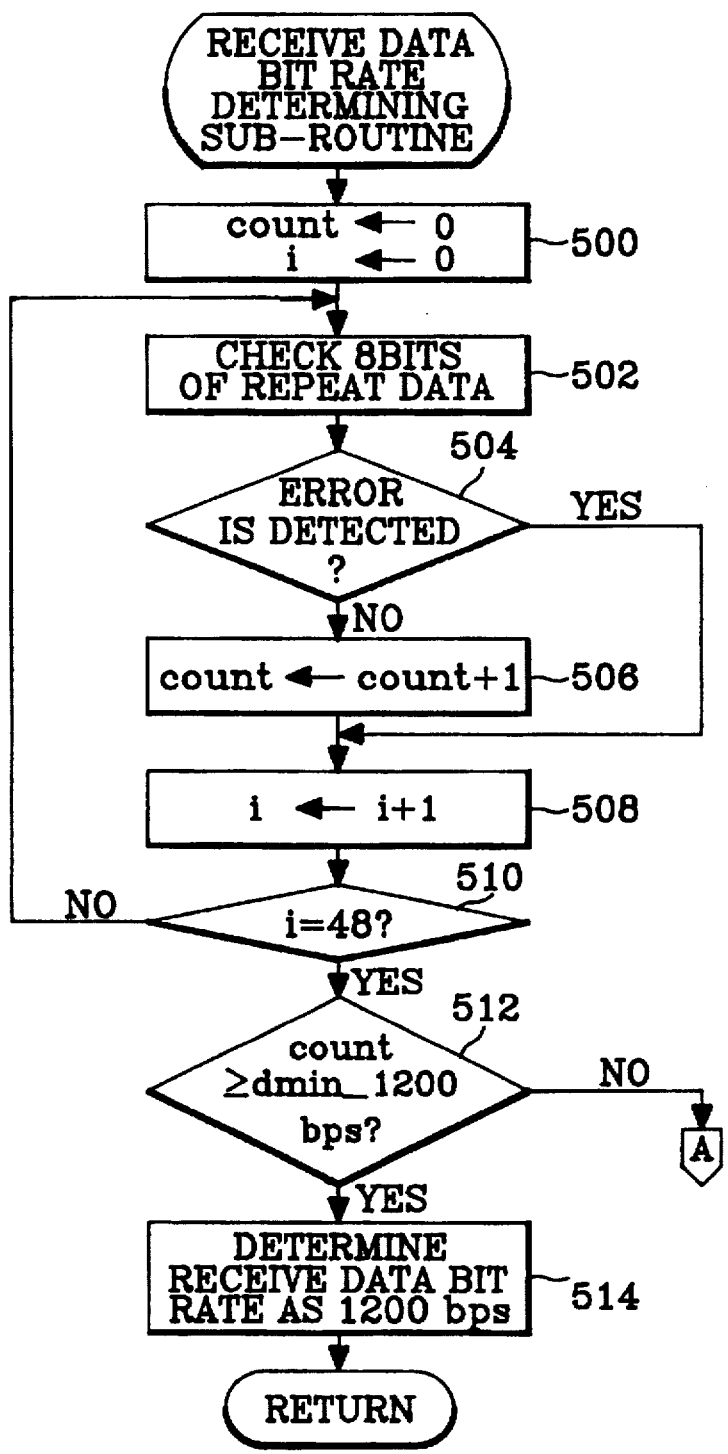
FIGS. 5, 5A and 5B are a flow chart illustrating a process for determining a receive data bit rate according to the present invention.
Figure 5A:
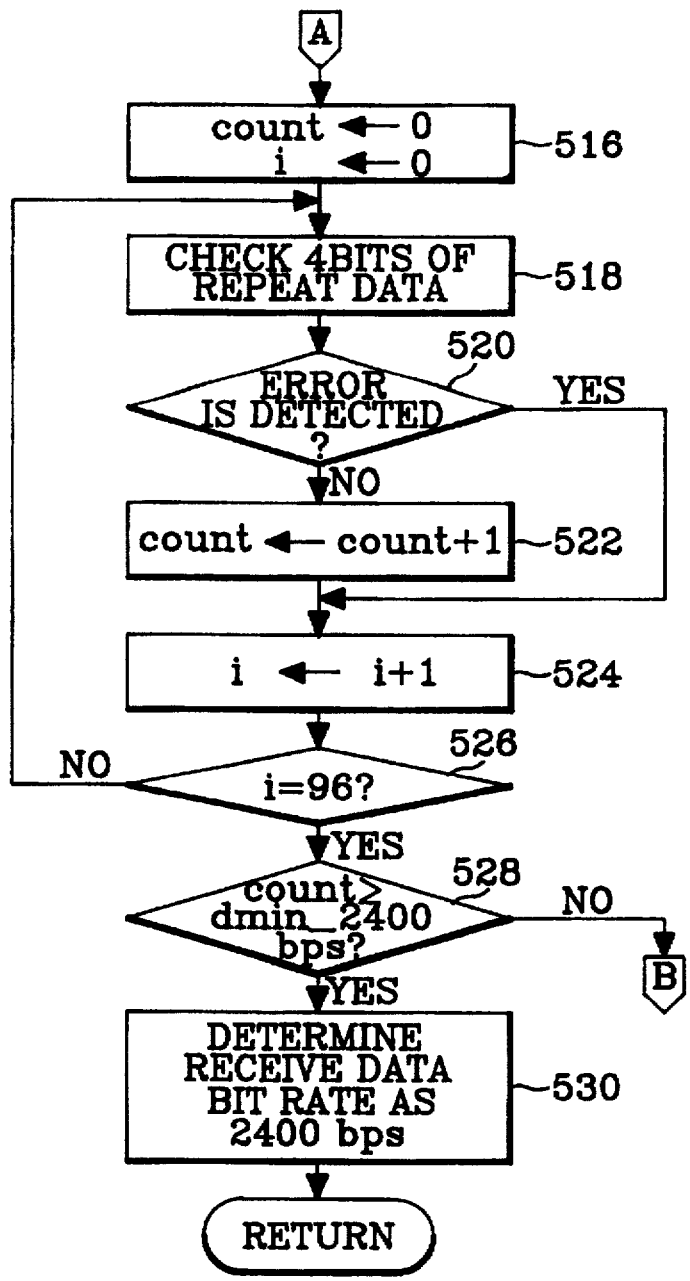
Figure 5B:
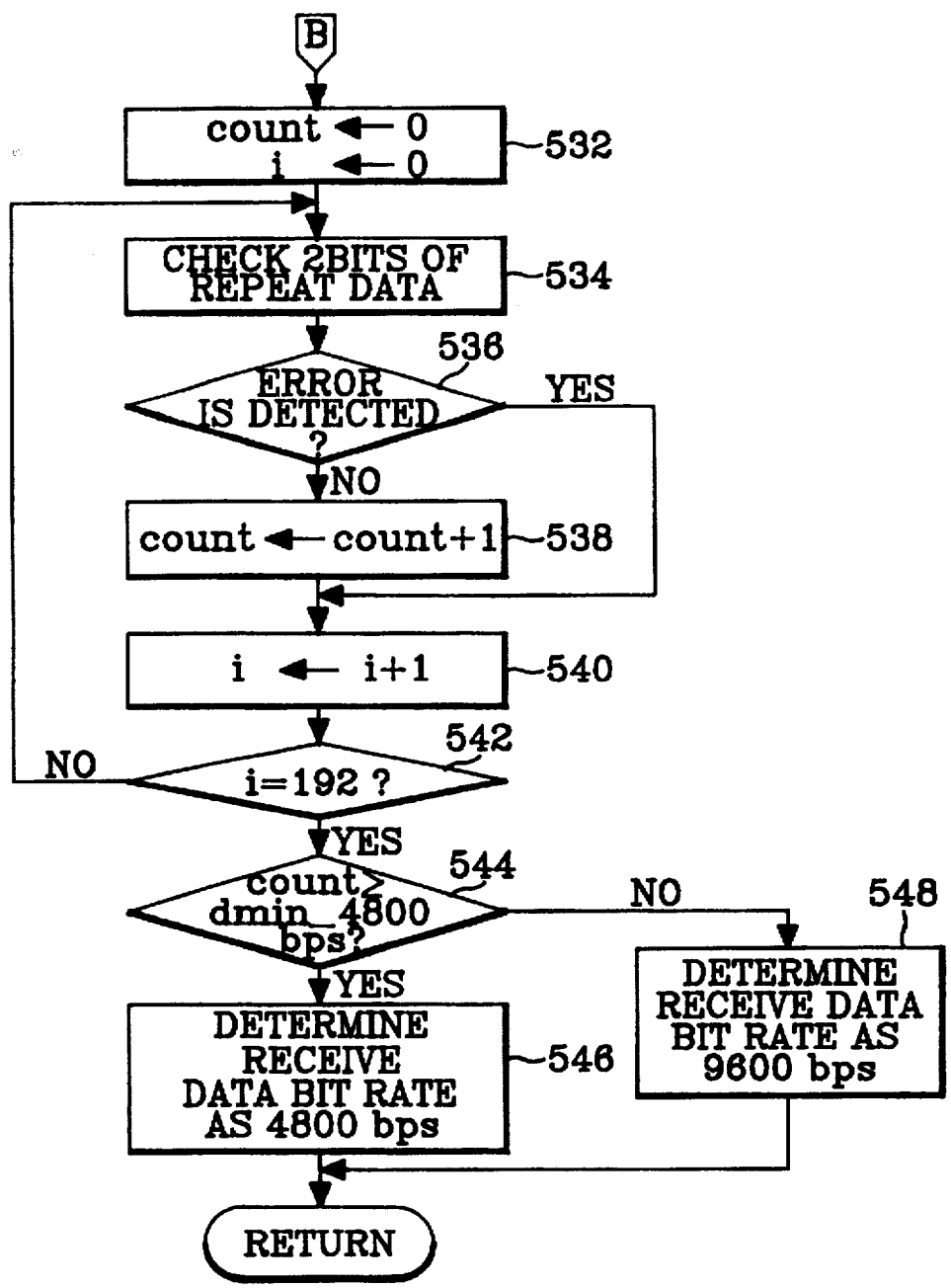

At the time of the channel-decoding operation of the DSP 206, the operation for determining the receive data bit rate in the step 408 is performed as in the flow chart shown in FIGS. 5, 5A and 5B. The receive data bit rate determining sub-routine shown in FIGS. 5, 5A and 5B is disclosed in Korean Paten Application No. 1993-17257 as mentioned above.

In step 500, a count and a repeat time are initialized, and in steps 502 to 504, it is checked whether respective MSB of 8 symbols S are equal to each other, thereby to detect an error. And in the case that the MSB is not equal to each other to thereby detect the error in the steps 502 to 504, only repeat time i is increased by 1 in step 508. In the case that the MSB is equal to each other not to thereby detect the error, the count is increased by 1 in step 506. Next, in the step 508, the repeat time i is increased by 1, and in step 510 it is checked whether the repeat time i is equal to 48. At this time, in the case that the repeat time i is not equal to 48, the step 502 is returned and the above steps are repeatedly performed until the repeat time i is equal to 48. In the step 510, in the case that the repeat time i is equal to 48, in step 512 the counting result value is compared with a 1200 bps reference value (which is value over 45 of 48) of a minimum repeat data of a 1200 bps of a de-interleaver output matrix. As a result, in the case that the counting value is larger or equal to the 1200 bps reference value, in step 514 it is determined that the receive data bit rate is 1200 bps and a returning step is performed.

Referring to FIG. 5A, in the case that the counting value is less than the 1200 bps reference value, in step 516 the count and the repeat time i are initialized, and in steps 518 to 520 it is checked whether the MSB of 4 symbols S is equal to each other to thereby check the error detection. In the steps 518 to 520, in the case that the MSB of 4 symbols S is not equal to each other to thereby detect the error, in step 524 the repeat time i is increased by 1. And in the case that the MSB of 4 symbols S is equal to each other not to thereby detect the error, in step 522 the count is increased by 1. Next, the repeat time i is increased by 1, and the step 518 is returned and the above steps are repeated until it is checked that the repeat time i is 96. In the case that it is checked that the repeat time i is 96 in the step 526, in step 528 the counting result value is compared with a 2400 bps reference value (which is value over 90 of 96) of the minimum repeat data of a 2400 bps of the de-interleaver output matrix. In the case that the counting value is larger or equal to the 2400 bps reference value, it is determined that the receive data bit rate is 2400 bps in step 530 and the returning step is performed.

In the case that the counting value is less than the 2400 bps reference value in the step 528, in step 532 (FIG. 5B) the count and the repeat time i are initialized, and in steps 534 to 536 it is checked whether the MSB of 2 symbols S is equal to each other to thereby check the error detection. In the steps 534 to 536, in the case that the MSB of 2 symbols S is not equal to each other to thereby detect the error, the repeat time i is increased by 1 in step 540. In the case that the MSB of 2 symbols S is equal to each other not to thereby detect the error, in step 538 the count is increased by 1. Next, in step 540, the repeat time i is increased by 1, and the step 534 is returned and the above steps are repeatedly performed until it is checked that the repeat time i is 192 in step 542. In the case that it is checked that the repeat time i is 192 in the step 542, the counting result value is compared with a 4800 bps reference value (which is value over 180 of 192) of the minimum repeat data of a 4800 bps of the de-interleaver output matrix in step 544. In the case that the counting value is larger or equal to the 4800 bps reference value, it is determined that the receive data bit rate is 4800 bps in step 546. In the case that the counting value is less than the 4800 bps reference value, it is determined that the receive data bit rate is 9600 bps in step 548 and the return step is performed.

Through above steps, the DSP 206 exactly determines that the receive data bit rate is one of 1200 bps, 2400 bps, 4800 bps and 9600 bps.

As discussed above, there is an advantage in which the channel-coding operation and the channel-encoding operation are performed every 20 msec with one DSP, thereby to simplify a terminal construction. Also, there is another advantage in which data which has been decoded/encoded and data which is to be decoded/encoded are simultaneously processed by the DSP, thereby to shorten the necessary time for operating.

While there have been illustrated and described what are considered to be preferred embodiments of the present invention, it will be understood by those skilled in the art that various changes and modifications may be made, and equivalents may be substituted for elements thereof without departing from the true scope of the present invention.

What's claimed is:

1. A terminal of a code division multiple access digital cellular communication system, comprising:

a demodulating unit for performing 4-bit soft decision of a signal having a variable data rate received from a base station, thereby to output demodulating data therefrom;

a speech encoding unit for encoding speech data for transmitting;

a digital signal processing unit for de-interleaving said demodulating data according to an interrupt signal generated every time unit previously set, determining a bit rate by utilizing said de-interleaved data and Viterbi-decoding said de-interleaved data, thereby to output said Viterbi-decoded data as first data therefrom, and repeatedly channel-encoding and interleaving data outputted from said speech encoding unit, thereby to output said interleaved data as second data therefrom;

a first buffer for temporarily buffering said data demodulated by said demodulating unit and then inputting said buffered data to said digital signal processing unit;

a second buffer for temporarily buffering data encoded by said speech encoding unit and then inputting said buffered data to said digital signal processing unit;

a speech decoding unit for speech-decoding said first data, thereby to restore said speech-decoded data as speech information; and a modulating unit for modulating said second data for transmitting said modulated data to said base station.

2. The terminal as claimed in claim 1, further including means for controlling said first buffer, for temporarily buffering said second data and then inputting said buffered data to said modulating unit, said first buffer being connected between said digital signal processing unit and said demodulating unit and said modulating unit; and means for controlling said second buffer for temporarily buffering said first data and then inputting said buffered data to said speech decoding unit, said second buffer being connected between said digital signal processing unit and said speech encoding unit and said speech decoding unit.

3. The terminal as claimed in claim 1, wherein said digital signal processing unit controls said first and second buffers, said first buffer receives demodulated data while said second buffer stores said first data and said first buffer stores said second data while said second buffer receives said encoded data.

4. A method for processing transmit and receive data in a terminal of a code division multiple access cellular communication system, comprising the steps of:

performing 4-bit soft decision for a signal having a variable data rate received from a base station, thereby to demodulate said 4-bit soft decision signal;

de-interleaving said demodulated signal, thereby to arrange said de-interleaved signal in a sequence of initial transmit data;

repeatedly counting respective symbols of said de-interleaved data as many times previously set and comparing said counted symbols with a reference value previously set, thereby to determine a receive data bit rate;

Viterbi-decoding data recorded at said determined data bit rate, restoring said Viterbi decoded data as speech information;

repeatedly channel-encoding and interleaving speech-encoded data to be transmitted to said base station; and modulating said interleaved data as data for transmitting, wherein said de-interleaving, said receive data bit rate determining, said Viterbi decoding, said encoding, and said interleaving are repeatedly and sequentially carried out within a period of around 20 msec.

5. A method for processing transmit and receive data in a terminal of a code division multiple access cellular communication system, comprising the steps of:

performing 4-bit soft decision for a signal having a variable data rate received from a base station, thereby to demodulate said 4-bit soft decision signal;

de-interleaving said demodulated signal, thereby to arrange said de-interleaved signal in a sequence of initial transmit data;

repeatedly counting respective symbols of said de-interleaved data as many times previously set and comparing said counted symbols with a reference value previously set thereby to determine a receive data bit rate;

Viterbi-decoding data recorded at said determined data bit rate, restoring said Viterbi decoded data as speech information;

repeatedly channel-encoding and interleaving speech-encoded data to be transmitted to said base station; and modulating said interleaved data as data for transmitting wherein said receive data bit rate determining is comprised of:

checking an equal state of respective 8 symbols of receive data in a state of initializing a count and a repeat time, thereby to detect a transmit error;

increasing said count and said repeat time by 1 in said equal state of respective 8 symbols, and comparing a counting result value with a 1200 bps reference value previously set in the case that said repeat time is 48, so that said counting result value is determined to be a 1200 bps receive data bit rate if said counting result value is larger than said 1200 bps reference value;

checking an equal state of respective 4 symbols of said receive data in said state of initializing said count and said repeat time, thereby to detect a transmit error;

increasing said count and said repeat time by 1 in said equal state of respective 4 symbols, and comparing a counting result value with a 2400 bps reference value previously set in the case that said repeat time is 96, so that said counting result value is determined to be a 2400 bps receive data bit rate if said counting result value is larger than said 2400 bps reference value;

checking an equal state of respective 2 symbols of said receive data in said state of initializing said count and said repeat time, thereby to detect a transmit error; and increasing said count and said repeat time by 1 in said equal state of respective 2 symbols, and comparing a counting result value with a 4800 bps reference value previously set in the case that said repeat time is 192, so that said counting result value is determined to be a 4800 bps receive data bit rate if said counting result value is larger than said 4800 bps reference value said counting result value is a 9600 bps receive bit rate if said counting result value is less than a 4800 bps reference value.

* * * * *